Inventor
Thomas N. Willcox
by Merton D. Morse
His Attorney

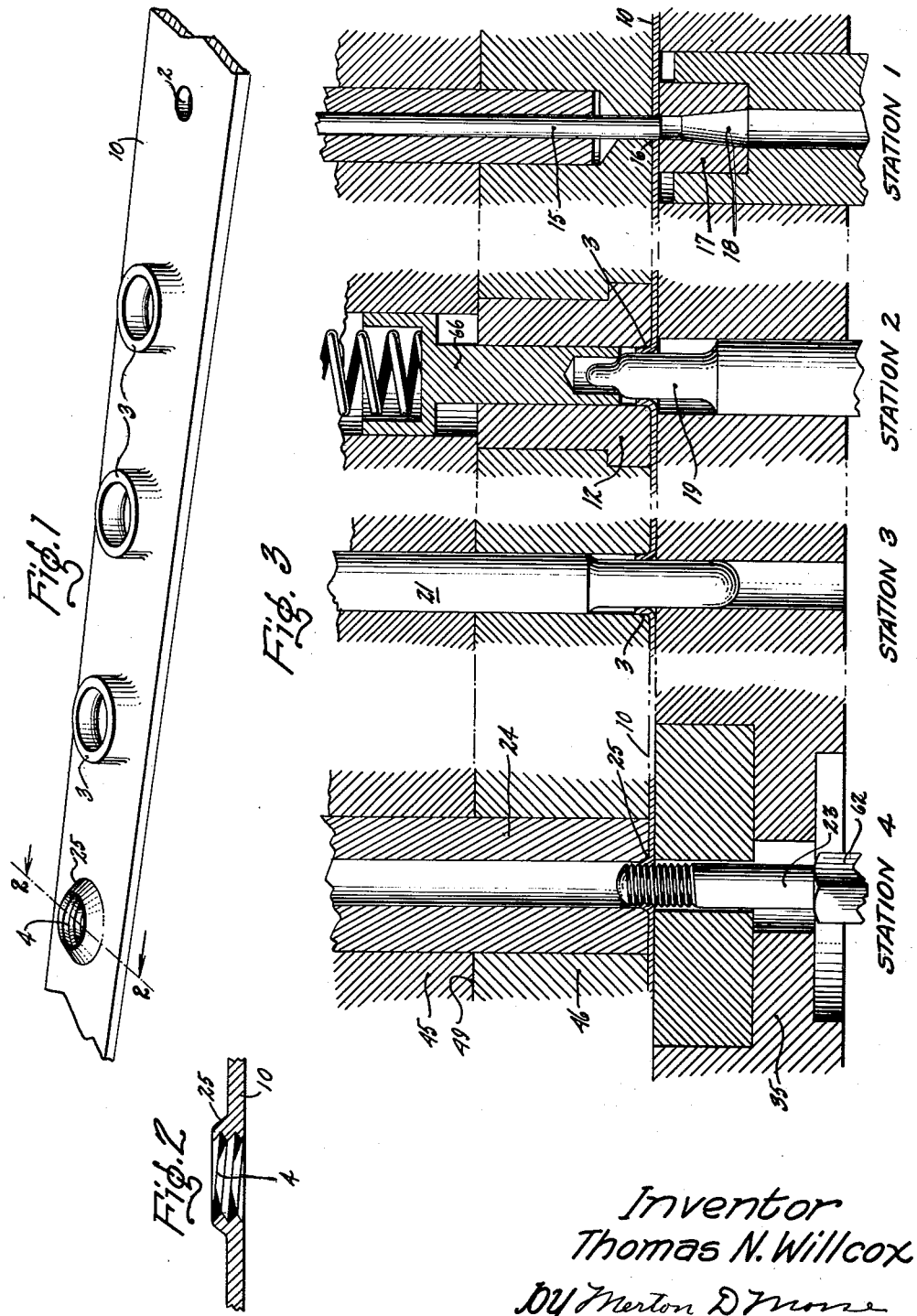

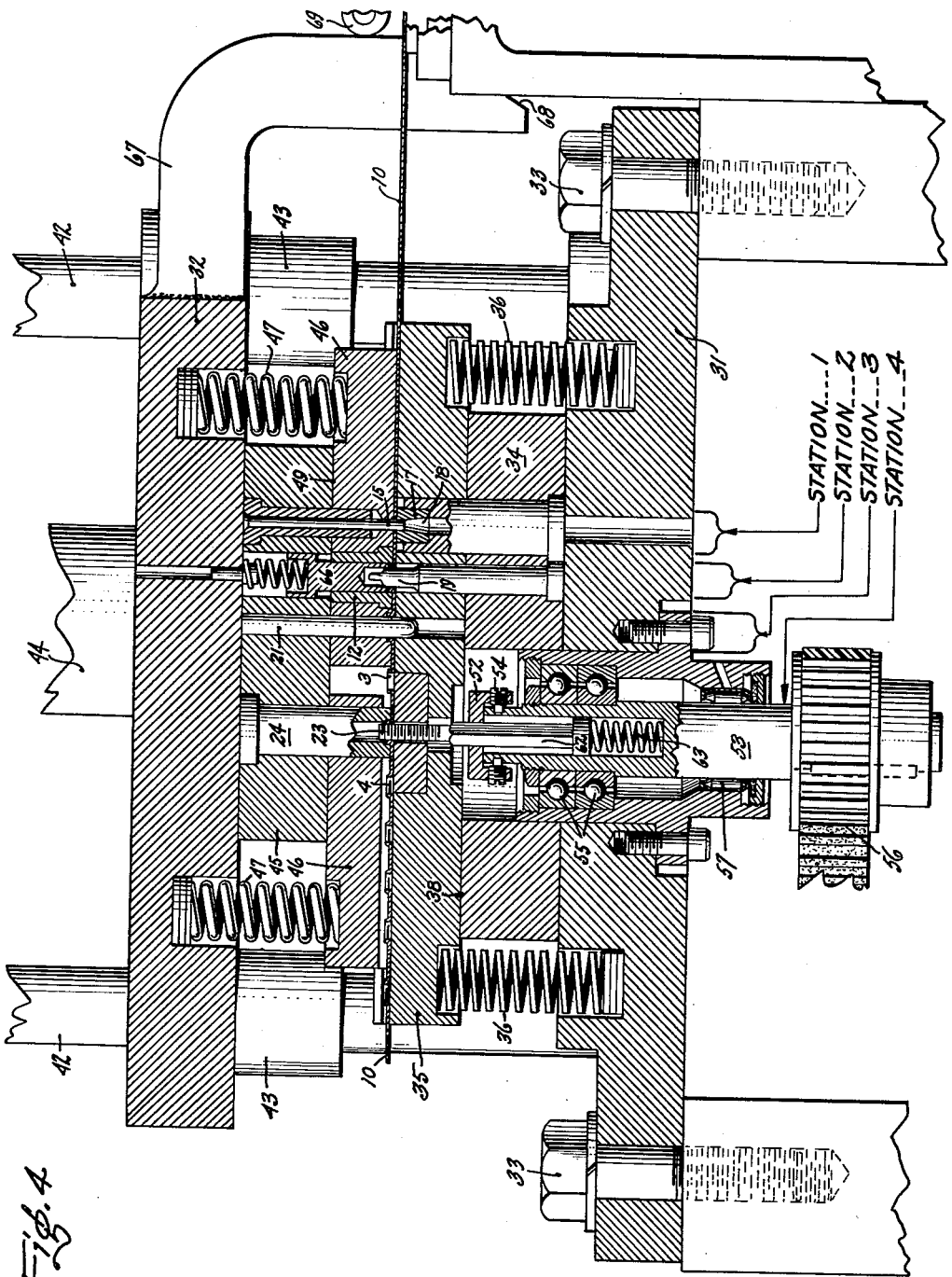

Inventor
Thomas N. Willcox
By Merton D. Moore
His Attorney

United States Patent Office 3,010,126
Patented Nov. 28, 1961

3,010,126
METHOD AND APPARATUS FOR FORMING INTERNAL THREADS BY SWAGING
Thomas N. Willcox, Schenectady, N.Y., assignor to General Electric Company, a corporation of New York
Filed May 26, 1958, Ser. No. 737,683
7 Claims. (Cl. 10—152)

My invention relates to means for producing threaded holes in material such as strips of sheet metal, or other impact deformable material.

Many uses exist for small pieces of sheet metal, or other impact deformable material, having threaded holes therein for purposes of attachment. Metallic contact members, to which electrical connections are attached, may be considered as an example. Such members are first cut from a suitable sheet of metal and are then shaped as desired for the intended use, and each member may have a hole formed therein which is individually tapped or threaded.

An object of my invention is to produce a device more economically to produce such members having such threaded holes.

In accord with my invention, a machine is provided through which a strip of material, such as sheet metal or metal plate, may be passed in step-by-step fashion. The machine has several stations, each step in the movement of the strip advancing it by the distance between stations so that each point on the strip at which work is done passes through the several stations in succession.

At the first station, a hole is punched into the strip. The strip is then advanced, and at a second station the material about the hole may be deformed to form a collar, or tubular deformation, about the hole. At the same time, a second hole through the strip is formed at the first station. Where material of sufficient thickness is used, this second station may be omitted. The strip is then again advanced, and at another station a thread is produced in the wall of the hole previously produced while further operations of the character described are repeated at the earlier stations. After the threaded holes are formed, the end of the strip having the threaded hole may be cut off as desired, and shaped or otherwise adapted for its intended use.

An object of my invention is to provide a machine of such character.

A further object of my invention is to provide improved means for producing such threaded holes.

A further object of my invention is to provide such means particularly adapted for use in threading previously formed holes in a machine of the above character.

In accord with my invention, a continuously rotating thread forming tap, or threading pin, is inserted in the hole to be formed. The driving means for rotating the tap includes means which permit its longitudinal movement out of the hole upon engagement of the threads of the tap with the material of the strip about the hole. Means are then operated, while the rotating tap is in the hole, to compress the material about the hole into the threads of the tap, whereupon the tap immediately and automatically retracts from the hole leaving the walls of the hole neatly and satisfactorily threaded.

This manner of producing the threads has the advantage of increased speed of operation. The thread forming tap is continuously rotated and is never reversed. Its speed of rotation may be sufficiently high that it withdraws from the threaded hole in time for the next advancement of the work, and this action can take place at punch press speeds. Normally about two or more complete threads are produced about the inner surface of the hole by the withdrawing pin or tap.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which:

FIG. 1 represents, by way of example, a strip of material which has been acted upon by my invention;

FIG. 2 is a cross sectional view along line 2—2 of FIG. 1;

FIG. 3 is a fragmentary sectional view of my invention showing the tool sets employed in engagement with the work piece at the different stations in my invention;

FIG. 4 shows the die set of a machine for producing work of the type illustrated in FIG. 1 with the parts in engagement with the work;

FIG. 1 shows a work piece 10 to be produced by my invention. This may be sheet metal or other material formed by a process such as casting, molding, extruding, rolling, or machining, and may be of desired thickness.

Figure 5:
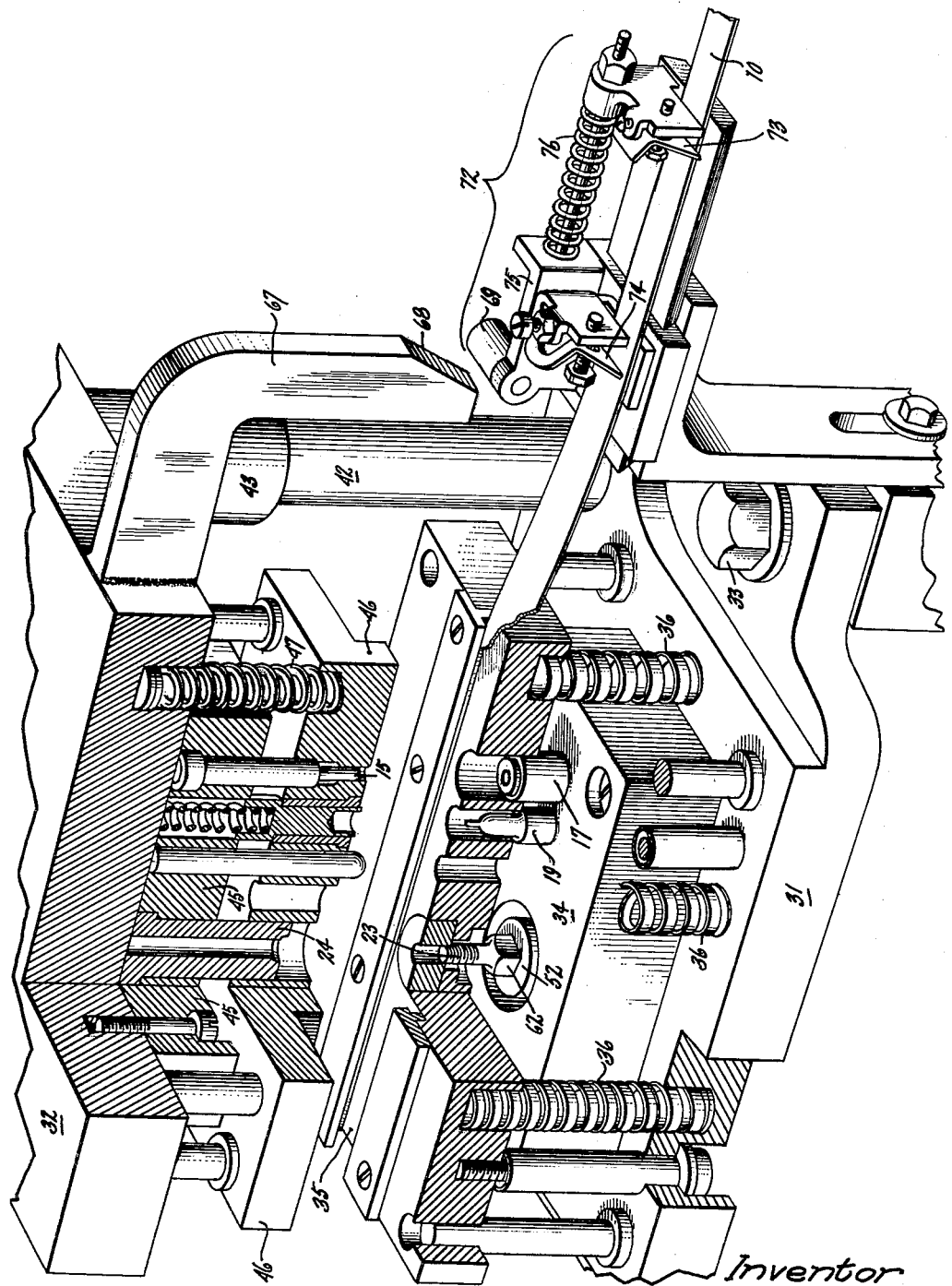
FIG. 5 shows the same die set with the upper punch plate assembly positioned away from the work.

This work piece may enter the machine as a plain strip of material. The strip is advanced through the machine step-by-step, being advanced at each step by the shortest distance between adjacent stations. At the first station in the machine, a hole, such as that shown at 2, is punched through the material. The strip is then advanced, and, at another station, the material about the hole is extruded to form a collar, or flange, as shown at 3, about the hole previously punched. Where the work material is of adequate thickness, this step may be omitted.

At a later station in the machine, a rotating threading pin, or tap, enters the collar formed at the second station, and a closing die presses the material of the collar into the threads of the rotating threading pin, thereby forming the threaded hole shown at 4 in FIG. 1, the collar being reduced to the cone-shape shown at 4.

Owing to engagement between the material of the collar and the threads of the rotating threading pin, the threading pin automatically withdraws, or unscrews, from the hole and becomes retracted from the work.

FIG. 3 shows the tool sets employed at the different stations, the different stations being designated by the legends station 1, station 2, station 3, and station 4.

The work piece 10 is shown in one particular position in the machine just after it has been acted upon by the tool sets at stations 1, 2, and 3, and while the parts are in engagement with the work, the threading pin 23 at station 4 being in the process of withdrawing from the hole in the work.

At station 1, a piercing punch 15 pierces the material at 16 by cooperating with the punch die 17. The portion of the material punched from the material 10 by punch 15 falls out through the opening 18 in the punch die 17. This is the first operation upon the work piece as it enters the machine.

At station 2, upon the next operation of the machine and advancement of the work to the left, the hole formed at station 1 is entered by a swage 19, which cooperates with a forming die 12 to extrude the material about the hole into a collar, flange, or tubular-like formation 3, as shown in FIG. 1.

At station 3, after the next advancement of the work, a locating pin 21 enters the collar 3, which was formed at station 2, and accurately locates the work piece 10 in order precisely to locate the hole to be cut at station 1 and to locate the work for the threading operation to take place at a subsequent station.

At station 4, a threading pin 23 enters the collar 3, which has been formed at the earlier station. This pin has a simple continuous thread of desired pitch and form about its exterior. It is continuously rotated and has an external diameter less than the inner diameter of the hole in the tubular, or collar, formation 3 and upon entering the hole it does not engage the work. It rotates at high speed, and its driving connection is of such character that, upon engagement of the threads of the threading pin 23 with the material of the strip, it immediately withdraws from the hole by reason of such engagement.

The upper assembly of the machine comprises a closing die 24, or press, which moves downward upon the downward movement of the die assembly to engage the collar 3 and to force the material of the collar 3 into the threads of the threading pin 23, whereupon, by reason of the engagement between the material of the collar and the threads of the threading pin, the threading pin immediately withdraws, or unscrews, from the work piece leaving the inner walls of the collar neatly, smoothly, and satisfactorily threaded by the threading pin. It will be noticed that the inner corners of the die 24 are rounded, or of cone-shape, as shown at 25, thereby to form the collar into the external cone-shape better shown at 4 in FIG. 1.

Of course, the different stations of the machine may all be spaced apart by a specified distance or by any integral multiple of such specified distance. For example, intermediate, or idle, stations at which no thread forming work is done may exist between stations 3 and 4, or between other stations.

FIG. 4 shows more completely a machine comprising a die set in accord with my invention, having a lower die shoe 31 and an upper reciprocating punch holder 32, the latter being in position just after the work has been acted upon by the machine but before the threading pin 23 has withdrawn from the hole.

The die shoe 31 is stationary, being mounted upon the frame of the machine by bolts 33 and carried upon it a die block 34 and a bottom stripper plate 35, the latter being supported from the die shoe 31 by springs 36 which, as shown in FIG. 4, are compressed to such an extent that the stripper plate and die block are in engagement along their adjoining parallel surfaces 38.

The punch holder 32 is arranged for vertical reciprocation on guide pins 42. To that end, it is provided with collars 43 through which the guide pins pass and which fit about the guide pins in proper relationship to produce satisfactory vertical reciprocation by reason of forces applied through the shank 44, which is actuated by any desired punch press reciprocating mechanism. The punch holder 32 carries a punch plate 45 and a top stripper plate 46. Between the punch holder 32 and the stripper plate 46 are springs 47 which, in the position of the equipment shown in FIG. 4, are compressed so that the punch plate 45 and top stripper plate are in engagement at their adjacent parallel surfaces 49.

The tool sets at the different stations are again designated in FIG. 4, as in FIG. 3, by the legends station 1, station 2, station 3, and station 4. The equipment is shown after power has been applied to actuate the upper assembly downward into engagement with the work piece 10. When the upper stripper plate 46 engages the work, it begins to compress the springs 47 forcing the lower stripper plate 35 downward, thereby compressing the springs 36. This continues until the upper surface of the upper stripper plate is engaged by the lower surface of the punch plate 45 at surfaces 49 and until the lower surface of the lower stripper plate 35 engages the upper surface of the die block 34 at surfaces 38.

In the meantime, the locating pin 21 at station 3, being longer than the other tool members which enter the work, enters one of the holes previously punched in the work piece 10 and accurately locates the strip 10 in all of the stations. The springs 36 and 47 are so selected relative to each other that surfaces 38 engage before surfaces 49, thereby causing tap 23 to enter the collar 3 of work piece 10 before die 24 engages the work, whereby the tap is fully into the collar 3 before the collar is engaged or deformed by die 24.

At station 2, the swage 19 enters the hole which was previously formed at station 1, and, in cooperation with die 12, produces the collar-like flange, or tubular formation 3, as described in connection with FIG. 2.

At station 1, the punch 15 pierces the work 10 forming a new hole and entering the punch die 17.

At station 4, the internal surface of the collars 3 formed at station 2 are threaded. This is effected by the threading pin 23 having a rectangular or polygonal shaped shank 62, which extends through a correspondingly shaped hole in a driving member 52, the latter of which is rotated by means of a vertical drive shaft 53, to which member 52 is connected by set screws 54. This drive shaft 53 is arranged for rotation in ball bearings, as shown at 55, and roller bearing, as shown at 57, and is driven as by a belt and pulley connection shown at 56.

The threading pin 23 has an external diameter smaller than the internal diameter of the collars 3 formed at station 2 so that it rotates freely within the hole. However, when the downward moving closing die 24 engages the collar, the material of the collar is forced into the threads of the threading pin 23, whereupon that pin immediately withdraws, or unscrews, from the hole and in moving downward compresses the spring 63 located within an axial bore in the shaft 53.

This completes the operation upon the work performed by actuation of the upper assembly downward against the work, as shown in FIG. 4.

Upon initial movement of the punch holder 32 in the upward direction, springs 47 and 36 expand so that stripper plate 46 parts from punch plate 45, and the lower stripper plate 35 parts from die block 34. This action moves the work upward away from threading pin 23 so that spring 63 may again expand. The end of the threading pin is flat or slightly rounded so it does not re-enter or damage the threads of the hole.

At the same time, the die or punch press 24 withdraws within the upper stripper plate 46, thereby clearing that member from the work.

Similarly, at station 2, the upward movement of the lower stripper plates raises the work clear of tool 19.

The upper stripper member moves upward relative to spring pressed ejector member 66 causing that member to clear the work from forming die 12 at station 2.

The upward movement of punch plate 45 causes the piercing punch 15 to be withdrawn from the work.

The punch holder 32 is provided at its right hand with a cam 67 having a cam surface 68, shown in FIG. 5, which cooperates with a roller 69 on a mechanism 72 (see FIG. 5) which controls the advance movement of the strip 10 through the machine. This mechanism 72, which is fully illustrated in FIG. 5, comprises two clamps 73 and 74 through which the strip 10 passes. The clamp 73 grips the strip upon reverse movement thereof and prevents such reverse movement; i.e., movement to the right, as shown in the figures. Clamp 74 is carried by member 75 which is actuated to the right by cam 68 and roller 69 against the action of spring 76 when cam 67 is operated downward.

When cam 67 is actuated upward, roller 69 rides down the cam surface 68 and finally disengages it, thereby permitting member 75 and clamp 74 to move to the left under influence of spring 76. Clamp 74, in this movement, grips the strip and advances it to the left by the distance between adjacent stations.

These clamps 73 and 74 are of well known construction commonly used in such equipment and require no further description. Their further operation is obvious from the structure illustrated in the drawings.

FIG. 5 shows the stripper plates 46 and 35 with springs 47 and 36 expanded so that these plates clear the work from the tools at stations 1, 2, 3, and 4, and permit the advance movement of the strip 10 by mechanism 72 in readiness for the next operation of the die. In the next operation, locating pin 21 enters the next hole accurately locating the strip in all the stations for proper operation as the dies close upon the work.

If desired, a cutter may be provided at the exit end of the machine and arranged, upon each downward movement of the upper die set, or after an integral number of such downward movements, to cut off the end of the strip after the desired holes have been formed and threaded.

As previously mentioned, where thick work material is used, for example, work having a thickness equal to or greater than the length of the collars 3 in FIG. 1, the formation of such collars is unnecessary, it being only necessary to punch a hole of proper size at station 1 and thread the hole, as thus formed at station 4, omitting station 2 altogether. It may be desirable, however, to employ a differently shaped die at 34. This die may take the form shown in FIG. 6.

Figure 6:
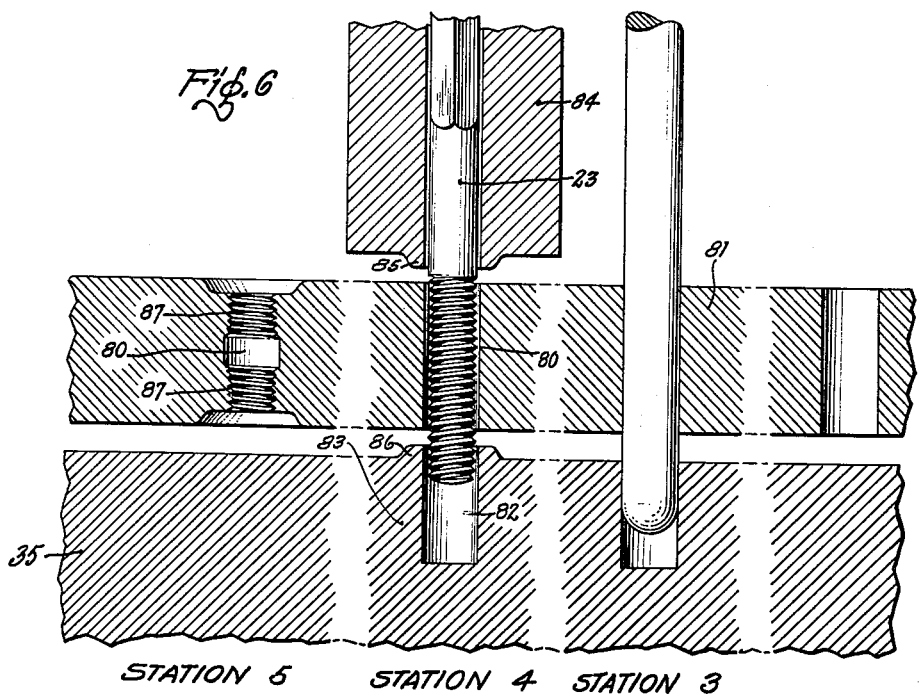
FIGS. 6 and 7 show modifications which may be employed to thread holes in thick material.

FIG. 6 shows the tap extending through a hole 80 in work piece 81 and into a further hole 82 in a die 83 which may be mounted in the lower stripper plate 35. The tap 23 is shown as having an outer diameter smaller than the diameter of holes 80 and 82 and threads extending all the way through the work piece and into hole 82. Both the upper die 84 and the die 83 have raised surfaces, as indicated at 85 and 86, about the tap which first engage the work piece 81 and compress the material of the work piece into the threads of the tap on both sides of the work piece 81. The tap, of course, immediately unscrews and withdraws from the hole, as described in connection with FIGS. 3, 4, and 5. A threaded hole is then formed, as shown at station 5, having threads 87 formed at each end of the hole where the material of the work is compressed into the threads of the die and having an unthreaded area near the center of the work where the material of the work piece is not deformed.

Figure 7:
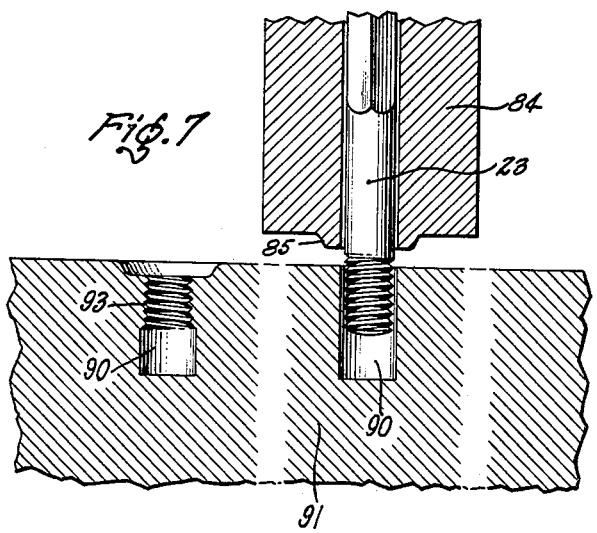

FIG. 7 shows the tap 23 extending into a hole 90 in the surface of a solid piece 91 of material, such as a malleable casting or forged block. The tap has a threaded portion extending into the hole, but not to its complete depth.

In this case, the die 84 having the raised surface 85 about the tap may be operated as a pneumatic, or air, hammer to impact the material of the block 91 into the threads of the tap 23 causing the rotating tap to unscrew from the hole leaving the hole 90 threaded, as shown at 93. Thus, the tap 23 and die 84 may be parts of a portable machine tool which may be power operated as by a pneumatic, compresed air, or other type motor and carried by the operator from place to place where holes are to be threaded.

I have been described in connection with FIGS. 1-6, inclusive, a machine with four or five stations. Additional stations may, of course, be employed in such a machine to effect additional operations. For example, where pieces having a particular shape and with one or more threaded holes therein are to be formed, the forming may be effected in another station and thereafter at a further station the strip may be cut into the desired pieces having the desired forms. Thus, the pieces leave the machine completely shaped, pierced, and threaded and ready for their intended use.

While I have shown a particular embodiment of my invention, I wish it to be understood that I do not wish to be limited thereto since many modifications in the general assembly of the machine and in the instrumentalities employed may be made, and I intend by the appended claims to cover any such modifications as fall within the true spirit and scope of my invention.

What I claim as new and desire to secure by Letters Patent of the United States is:

1. The method of threading holes in impact deformable material, which comprises the steps of inserting in the hole in the material to be threaded a continuously rotating threaded member of diameter smaller than the hole, deforming said material about the hole into the threads of said rotating member during its rotation thereby causing said member to engage the threads so formed in the material about the hole and to move longitudinally of itself out of said hole by reason of engagement with said material.

2. A method of producing threaded holes in sheet metal, which comprises the step of punching a hole in said metal, extruding the material about the hole into a collar about the hole, inserting a continuously rotating threaded member which is smaller than the hole into the hole, and compressing the material of said collar into the threads of said continuously rotating member, said rotating member engaging the threads so formed in the compressed material of said collar to cause longitudinal movement and consequent withdrawal of the rotating member from the threaded hole formed.

3. In a machine for producing threaded holes in sheet metal, the combination of means to punch holes in said sheet metal, means to distort the material about the hole into a collar-like formation about the hole, a threaded member being smaller than said hole, means continuously to rotate said member, means to insert said rotating threaded member into a hole to be threaded, and means to force the material of said formation into the threads of said rotating member to form threads in the formation thereby causing engagement between the threads of the rotating member and the threads of the formation resulting in longitudinal movement of the rotating member and withdrawal of said member from the hole.

4. The combination, in a machine for forming threaded holes in a strip of sheet material, said machine having a plurality of stations through which said strip passes in succession, one station having means to punch holes in said strip, another station having means to deform the material about said holes into collar-like formations, and another station having a thread forming member arranged for insertion into said collar-like formations, said thread forming member being smaller than said holes, means for rotating said member while in said collar-like formations while not restraining longitudinal movement thereof out of said collar, and means to force the material of said collar into the threads of said rotating member to form threads in said collar which engage the rotating member resulting in longitudinal movement of the rotating member and withdrawal of the member from the collar.

5. The combination, in a thread forming machine, of a die shoe and a punch plate, said punch plate being arranged for reciprocation toward and away from said shoe, a plurality of sets of tools, each set comprising one or more members reciprocated by said punch plate and each arranged to cooperate with corresponding tools associated with said shoe, one set comprising a punch associated with said punch plate to cooperate with a punch die associated with said die shoe, and another set comprising a threading pin arranged upon reciprocation of said punch plate to enter the work material and cooperate with a closure press on the opposite side of the work, means to continuously rotate said threading pin, means to permit longitudinal movement of the pin relative to the punch plate, means to pass a strip of work material between said plate and shoe to be acted on by said tool sets upon movement thereof toward each other, said strip being advanced longitudinally a desired distance upon each reciprocation of said punch plate, said tool sets being so positioned and arranged that upon each reciprocation said punch and punch die punches a hole in said strip, said threading pin of another set enters a hole pierced on an earlier reciprocation and enters into said die press, said threading pin being smaller than the hole, said die press being shaped to engage said material and force it into the threads of said threading pin during its rotation, and threads are produced thereby in the wall of said hole which engage the threading pin and cause longitudinal movement thereof and withdrawal of the pin from the material.

6. The method of threading holes in impact deformable material which comprises the steps of inserting into the hole in the material a continuously rotating threaded member smaller than said hole, impacting the material about the hole to deform it into the threads of said rotating member, the rotation of said member being in such a direction that said member moves in a longitudinal direction and withdraws from the hole upon engagement between the threads of the member and said material.

7. In combination, a forming die having a surface for engaging work and a hollow extending at right angles to said surface, a threading pin in said hollow, means to continuously rotate said pin, and means to bias said pin to project from said hollow through said surface, said projecting end having threads in its surface whereby said pin may project into a larger hole to be threaded in a work piece engaging said surface, and means to impact said work piece by said die to force the material of the work piece against said threads in said rotating pin, rotation of said pin being in a direction to cause said pin to longitudinally retract from said hole against said bias upon engagement of said threads with said impacted material.

References Cited in the file of this patent

UNITED STATES PATENTS

| | | |
|---|---|---|
| 1,378,980 | Rockwood | May 24, 1921 |
| 2,205,871 | Young | June 25, 1940 |
| 2,441,580 | Mageoch | May 18, 1948 |
| 2,731,175 | Fray | July 19, 1955 |
| 2,715,233 | Clark | Aug. 16, 1955 |
| 2,738,573 | Keller | Mar. 20, 1956 |
| 2,749,561 | Rush | June 12, 1956 |